United States Patent
Chi

(10) Patent No.: US 6,918,198 B2
(45) Date of Patent: Jul. 19, 2005

(54) FOOTWEAR WITH AN AIR CUSHION AND A METHOD FOR MAKING THE SAME

(76) Inventor: Cheng-Hsian Chi, No. 318, Shih-Cheng-Pei 1st Rd., Hsi-Tun Dist., Taichung City (TW)

( * ) Notice: Subject to any disclaimer, the term of this patent is extended or adjusted under 35 U.S.C. 154(b) by 82 days.

(21) Appl. No.: 10/650,945

(22) Filed: Aug. 18, 2003

(65) Prior Publication Data

US 2004/0031170 A1 Feb. 19, 2004

(51) Int. Cl.[7] .......................... A43B 13/20; A43B 13/28
(52) U.S. Cl. ............................ 36/29; 36/3 B; 36/30 R; 36/35 B
(58) Field of Search ............................ 36/29, 28, 3 B, 36/3 R, 30 R, 36 R, 37, 35 B, 141

(56) References Cited

U.S. PATENT DOCUMENTS

| | | | | |
|---|---|---|---|---|
| 4,670,995 A | * | 6/1987 | Huang | 36/29 |
| 4,722,131 A | * | 2/1988 | Huang | 29/450 |
| 4,852,274 A | * | 8/1989 | Wilson | 36/29 |
| 4,930,231 A | * | 6/1990 | Liu | 36/30 R |
| 5,005,300 A | * | 4/1991 | Diaz et al. | 36/28 |
| 5,220,737 A | * | 6/1993 | Edington | 36/28 |
| 5,335,430 A | * | 8/1994 | Fiso et al. | 36/29 |
| 5,367,791 A | * | 11/1994 | Gross et al. | 36/28 |
| 5,369,896 A | * | 12/1994 | Frachey et al. | 36/29 |
| 5,607,749 A | * | 3/1997 | Strumor | 36/29 |
| 5,918,383 A | * | 7/1999 | Chee | 36/28 |
| 6,681,500 B2 | * | 1/2004 | Moretti | 36/3 B |

FOREIGN PATENT DOCUMENTS

WO    WO 94/23603 A1 * 10/1994 ........... A43B/13/40

* cited by examiner

Primary Examiner—Anthony Stashick
(74) Attorney, Agent, or Firm—Townsend and Townsend and Crew LLP

(57) ABSTRACT

An article of footwear includes an air cushion sandwiched between an upper and an outsole. The air cushion confines an air chamber and has a bottom wall formed with a plurality of grooves that are respectively confined by groove-confining walls and that extend inwardly of the air chamber. The outsole includes a plurality of studs that respectively extend into the grooves and that are respectively bonded to the groove-confining walls.

7 Claims, 10 Drawing Sheets

PREPARING AN AIR CUSHION HAVING A BOTTOM WALL FORMED WITH A PLURALITY OF GROOVES

PREPARING AN OUTSOLE FORMED WITH A PLURALITY STUDS

PLACING AND ASSEMBLING THE AIR CUSHION, THE OUTSOLE, AND AN UPPER IN A MOLD IN SUCH A MANNER THAT THE STUDS RESPECTIVELY EXTEND INTO THE GROOVES

INJECTING AIR INTO THE AIR CUSHION

THERMALLY MOLDING THE AIR CUSHION, THE OUTSOLE, AND THE UPPER

FIG. 5

FOOTWEAR WITH AN AIR CUSHION AND A METHOD FOR MAKING THE SAME

BACKGROUND OF THE INVENTION

1. Field of the Invention

This invention relates to footwear with an air cushion and a method for making the same.

2. Description of the Related Art

FIGS. 1 and 2 illustrate a conventional shoe disclosed in U.S. Pat. No. 4,722,131. The shoe includes an upper 8, an outsole 9, and an air cushion 7 sandwiched between the upper 8 and the outsole 9. The air cushion 7 is made from an elastomeric material so as to be inflatable up to about 40 psi, and is formed with a plurality of depressions 70 for the purpose of providing vertical support thereto. Since the air cushion 7 is made from an elastomeric material, it is relatively soft. As a consequence, the strength of the vertical support given by the depressions 70 to the air cushion 7 is insufficient. A foam material can be used to encapsulate the air cushion 2 and fill the depressions 70 so as to enhance the strength of the vertical support to the air cushion 7. However, the foam material is also a soft material. As such, there is still a need to enhance the strength of the vertical support to a conventional air cushion. Moreover, using a foam material to enhance the strength of the vertical support to the air cushion significantly increases the manufacturing cost of the shoe. The depressions 70 divide the air cushion 7 into a plurality of cells that are in fluid communication with one other. However, the structure as such is disadvantageous in that once the air cushion 70 is compressed at one end thereof, the other end of the air cushion 70 expands, so that said one end of the air cushion 70 will be significantly depressed, which results in an imbalance in the cushioning effect between the two ends of the air cushion 70 and insufficient cushioning at said one end of the air cushion 70.

SUMMARY OF THE INVENTION

Therefore, the object of the present invention is to provide an article of footwear that is capable of overcoming the aforementioned drawbacks.

Another object of this invention is to provide a method for making the article of footwear of this invention.

According to one aspect of the present invention, an article of footwear comprises: an upper having a peripheral wall with a bottom end that defines a bottom opening, and an insole that covers the bottom opening and that is connected to the bottom end of the peripheral wall; an outsole spaced apart from and vertically aligned with the insole, having a horizontal base, and formed with a plurality of studs that project from the horizontal base toward the insole; and an air cushion sandwiched between the insole and the outsole and including a top wall that is bonded to the insole and that has a peripheral edge, a bottom wall that is bonded to the outsole and that has a peripheral edge, and a cushion peripheral wall that interconnects the peripheral edges of the top and bottom walls, and that cooperates with the top and bottom walls to confine an air chamber thereamong. The bottom wall has a horizontal wall portion that is bonded to the horizontal base of the outsole, and a plurality of grooves, each of which is confined by a groove-confining wall that extends inwardly from the horizontal wall portion into the air chamber. Each of the studs extends into a respective one of the grooves, and has an outer surface that conforms and that is bonded to the groove-confining wall.

According to another aspect of the present invention, a method for making an article of footwear comprises the steps of: preparing an upper that has a peripheral wall with a bottom end that defines a bottom opening, and an insole that covers the bottom opening and that is connected to the bottom end of the peripheral wall; preparing an outsole having a horizontal base, and formed with a plurality of studs that project from the horizontal base; mounting the upper on a last; forming an inflatable air cushion that includes a top wall with a peripheral edge, a bottom wall with a peripheral edge, and a cushion peripheral wall interconnecting the peripheral edges of the top and bottom walls and cooperating with the top and bottom walls to confine an air chamber thereamong, the bottom wall having a horizontal wall portion, and a plurality of grooves, each of which is confined by a groove-confining wall that extends inwardly of the air chamber from the horizontal wall portion; placing and assembling the air cushion, the outsole, and the upper which is mounted on the last in a mold in such a manner that the air cushion is sandwiched between the insole and the outsole, that the top wall confronts the insole, that the horizontal wall portion of the bottom wall confronts the horizontal base, and that each of the studs extends into a respective one of the grooves; injecting air into the air chamber so as to permit expansion of the air cushion and so as to permit abutment of the cushion peripheral wall against an inner side wall of the mold, abutment of the top wall against the insole, and abutment of the horizontal wall portion of the bottom wall against the horizontal base; and thermally molding assembly of the air cushion, the outsole, and the upper in the mold so as to shape the cushion peripheral wall in accordance with the shape of the inner side wall of the mold and so as to permit bonding between the top wall and the insole, between the horizontal wall portion of the bottom wall and the horizontal base, and between each of the studs and the respective groove-confining wall.

BRIEF DESCRIPTION OF THE DRAWINGS

In the drawings which illustrate embodiments of the invention,

FIG. 5 is a block diagram to illustrate how the article of footwear of FIG. 3 is made according to a method of this invention;

DETAILED DESCRIPTION OF THE PREFERRED EMBODIMENT

Figure 1:
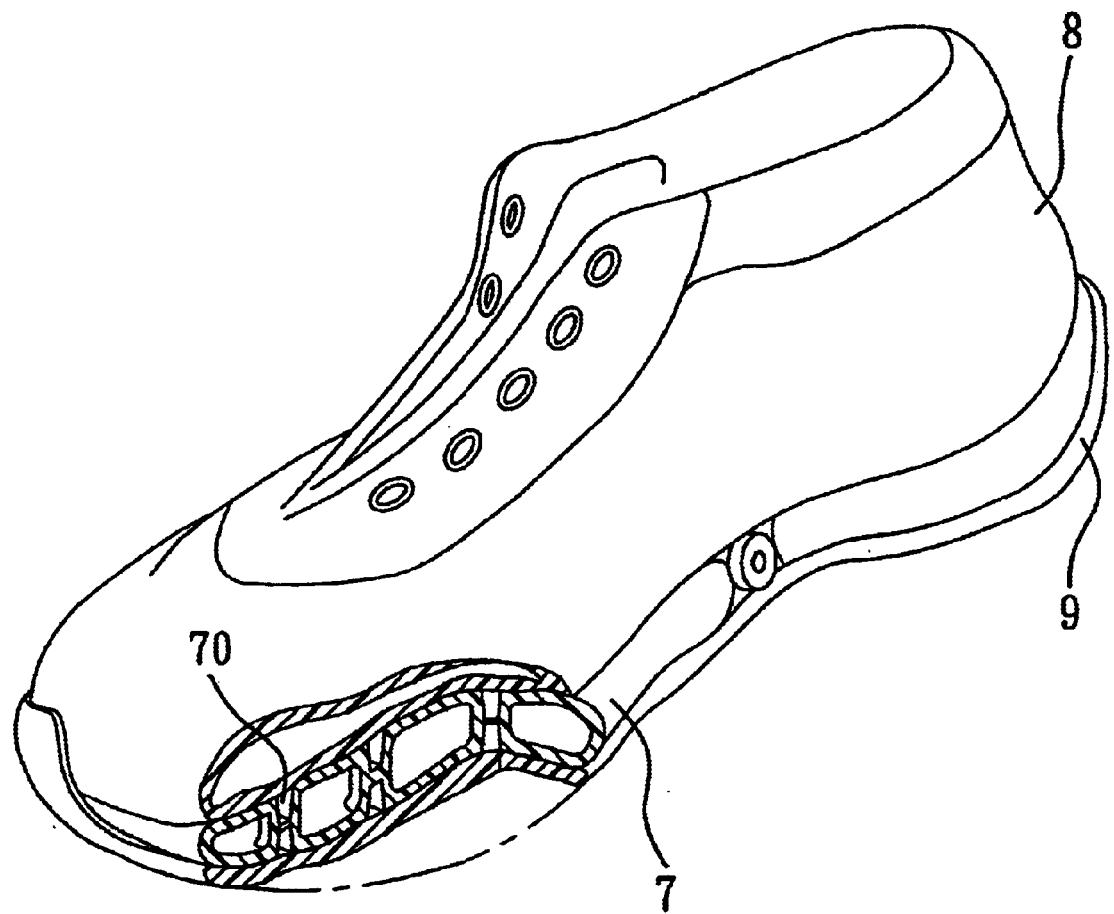
FIG. 1 is a cutaway view to illustrate a conventional article of footwear with an air cushion.
Figure 2:
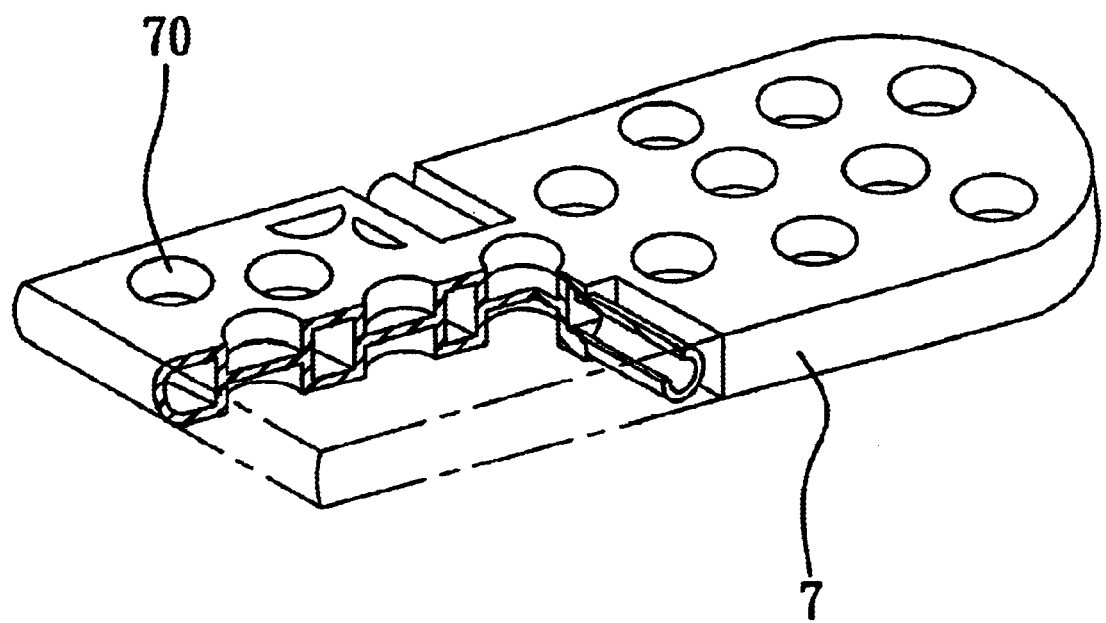
FIG. 2 is a cutaway view to illustrate the structure of the air cushion of the conventional article of footwear.

For the sake of clarity, like elements are denoted by the same reference numerals throughout the disclosure.

Figure 3:
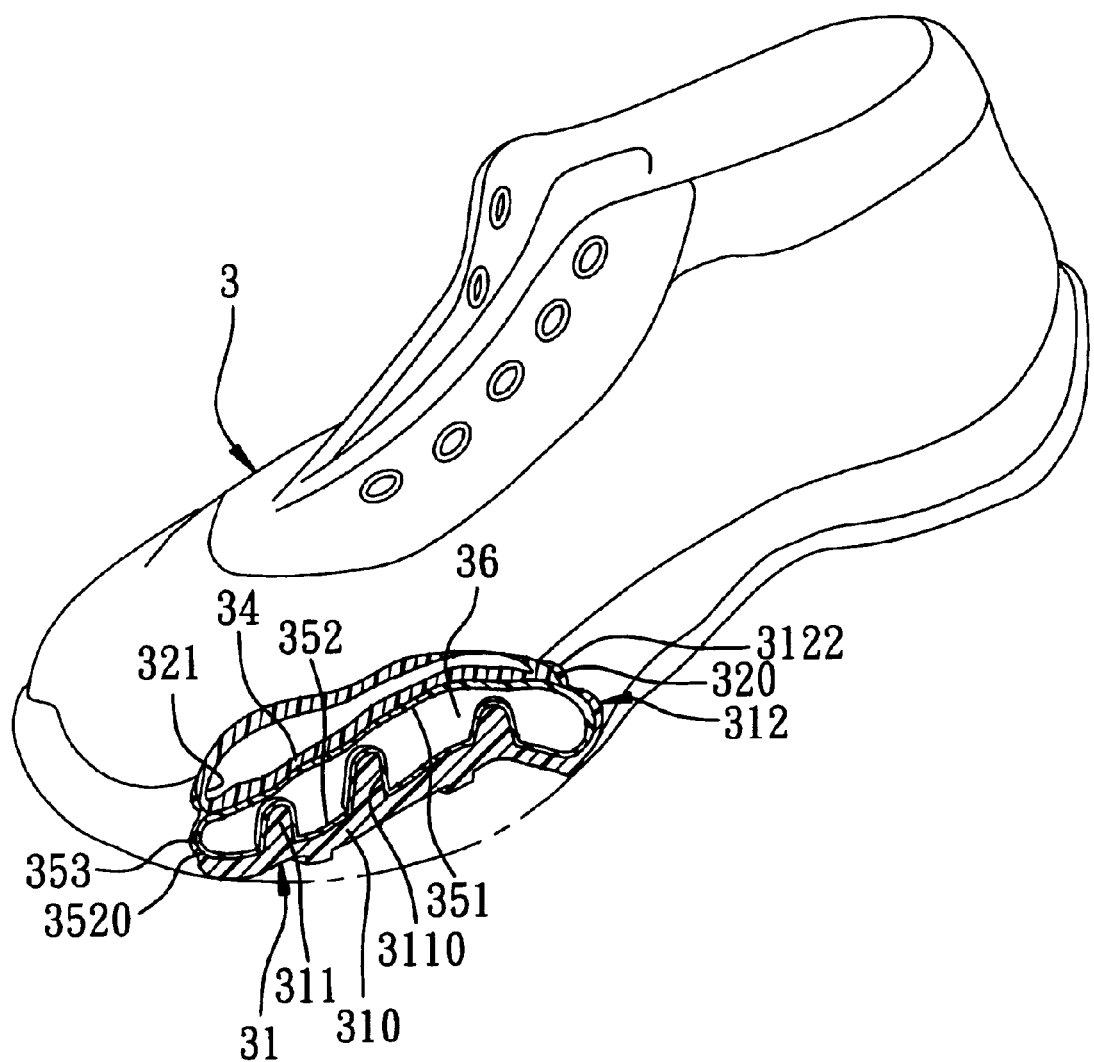
FIG. 3 is a cutaway view of an article of footwear embodying this invention.

FIG. 3 illustrates a preferred embodiment of an article of footwear of this invention. The article of footwear includes: an upper 3 having a peripheral wall 32 with a bottom end 320 that defines a bottom opening, and an insole 34 that covers the bottom opening and that is connected to the bottom end 320 of the peripheral wall 32; an outsole 31 spaced apart from and vertically aligned with the insole 34, having a horizontal base 310, and formed with a plurality of studs 311 that project from the horizontal base 310 toward the insole 34; and an air cushion 35 sandwiched between the insole 34 and the outsole 31 and including a top wall 351 that is bonded to the insole 34 and that has a peripheral edge 3510, a bottom wall 352 that is bonded to the outsole 31 and that has a peripheral edge 3520, and a cushion peripheral wall 353 that interconnects the peripheral edges 3510, 3520 of the top and bottom walls 351, 352, and that cooperates with the top and bottom walls 351, 352 to confine an air chamber 36 thereamong. The bottom wall 352 has a horizontal wall portion 3521 that is bonded to the horizontal base 310 of the outsole 31, and a plurality of grooves 3522, each of which is confined by a groove-confining wall 3523 that extends inwardly from the horizontal wall portion 3521 into the air chamber 36. Each of the studs 311 extends into a respective one of the grooves 3522, and has an outer surface 3110 that conforms and that is bonded to the groove-confining wall 3523 so as to provide vertical support to the air cushion 35. Since the outsole 31 is normally made from a material that has a hardness greater than that of the air cushion 35, the problem of insufficient strength of the vertical support encountered in the prior art can be eliminated. Moreover, the drawback with respect to the relatively high manufacturing cost of the shoe of the prior art resulting from the formation of the foam body on the air cushion can be overcome.

The horizontal base 310 of the outsole 31 has a peripheral edge 3101. The peripheral wall 32 of the upper 3 has a bottom portion 321. The outsole 31 further has a top peripheral flange 312 that has a lower portion 3121 extending upwardly from the peripheral edge 3101 of the horizontal base 310 and surrounding and bonded to the cushion peripheral wall 353 of the air cushion 35, and an upper portion 3122 extending upwardly from the lower portion 3121 and surrounding and bonded to the bottom portion 321 of the peripheral wall 32 of the upper 3.

Figure 4:
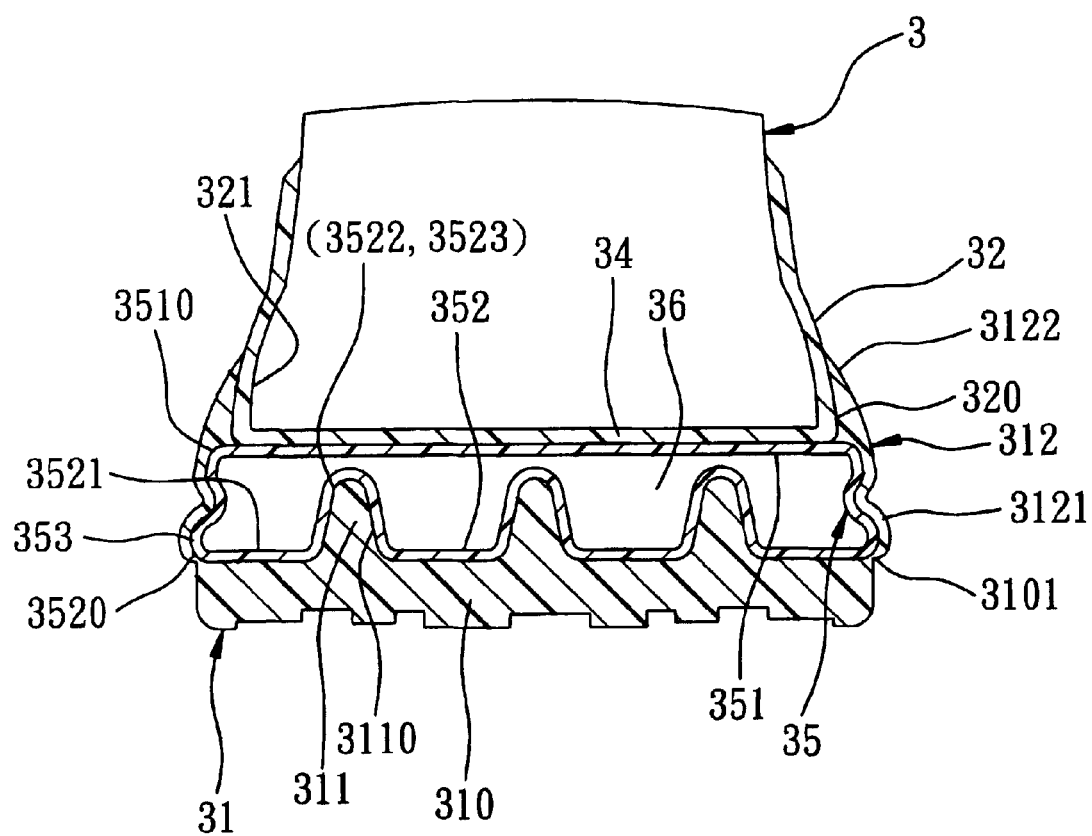
FIG. 4 is a fragmentary rear sectional view of the article of footwear of FIG. 3.
Figure 6:
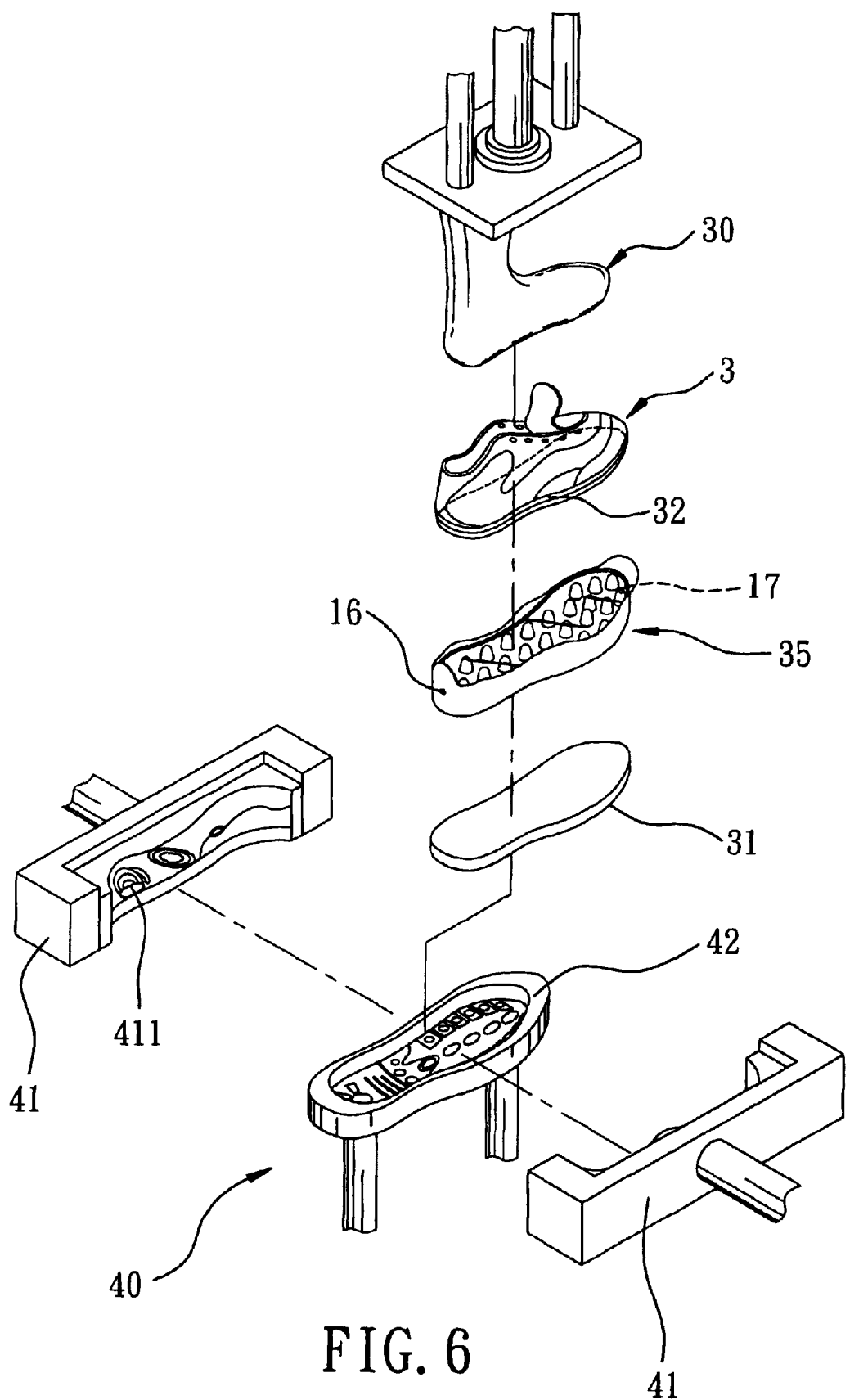
FIG. 6 is an exploded perspective view to illustrate how the article of footwear of FIG. 3 is made according to the method of this invention.
Figure 7:
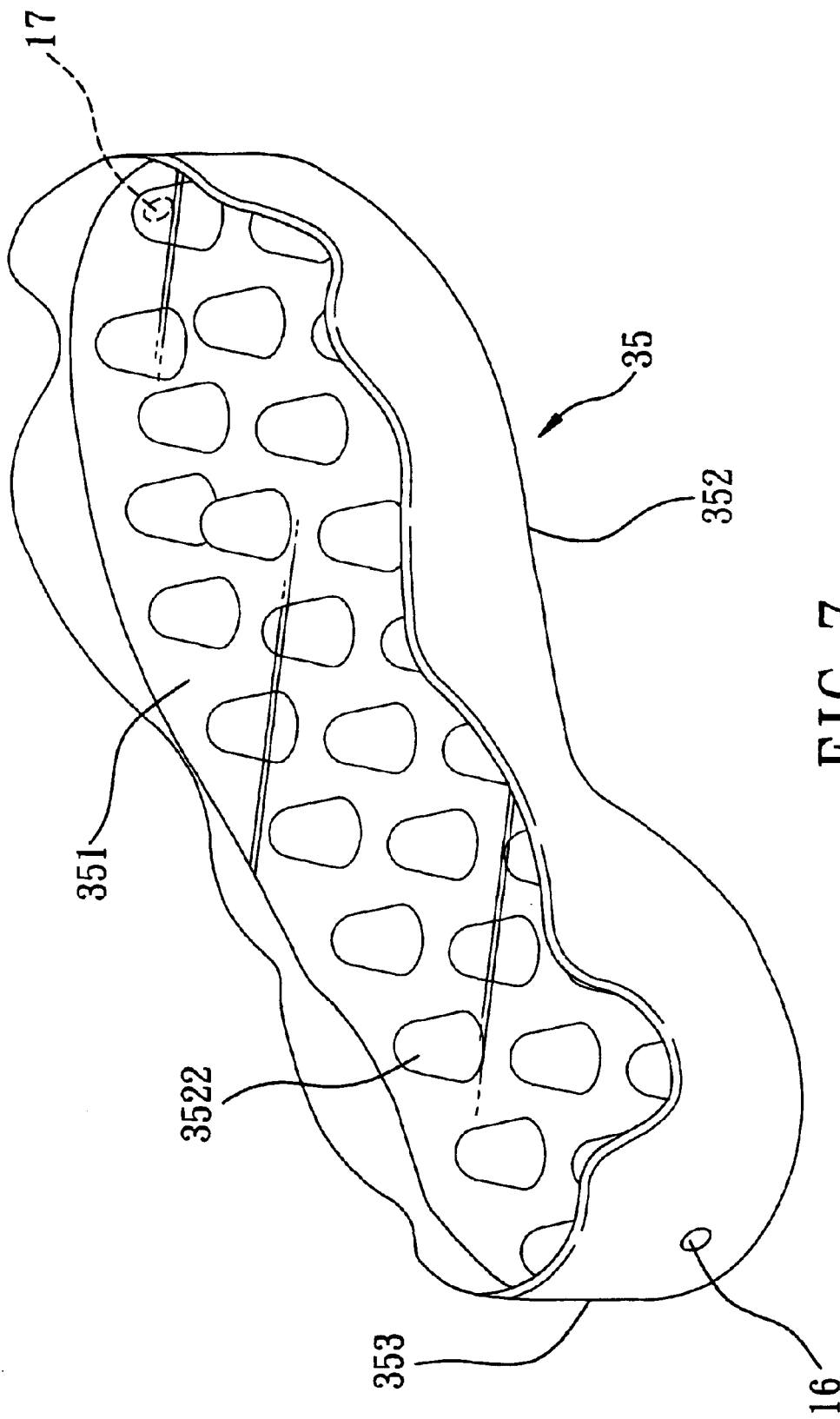
FIG. 7 is a perspective view of an air cushion used in the article of footwear of FIG. 3 according to the method of this invention.
Figure 8:
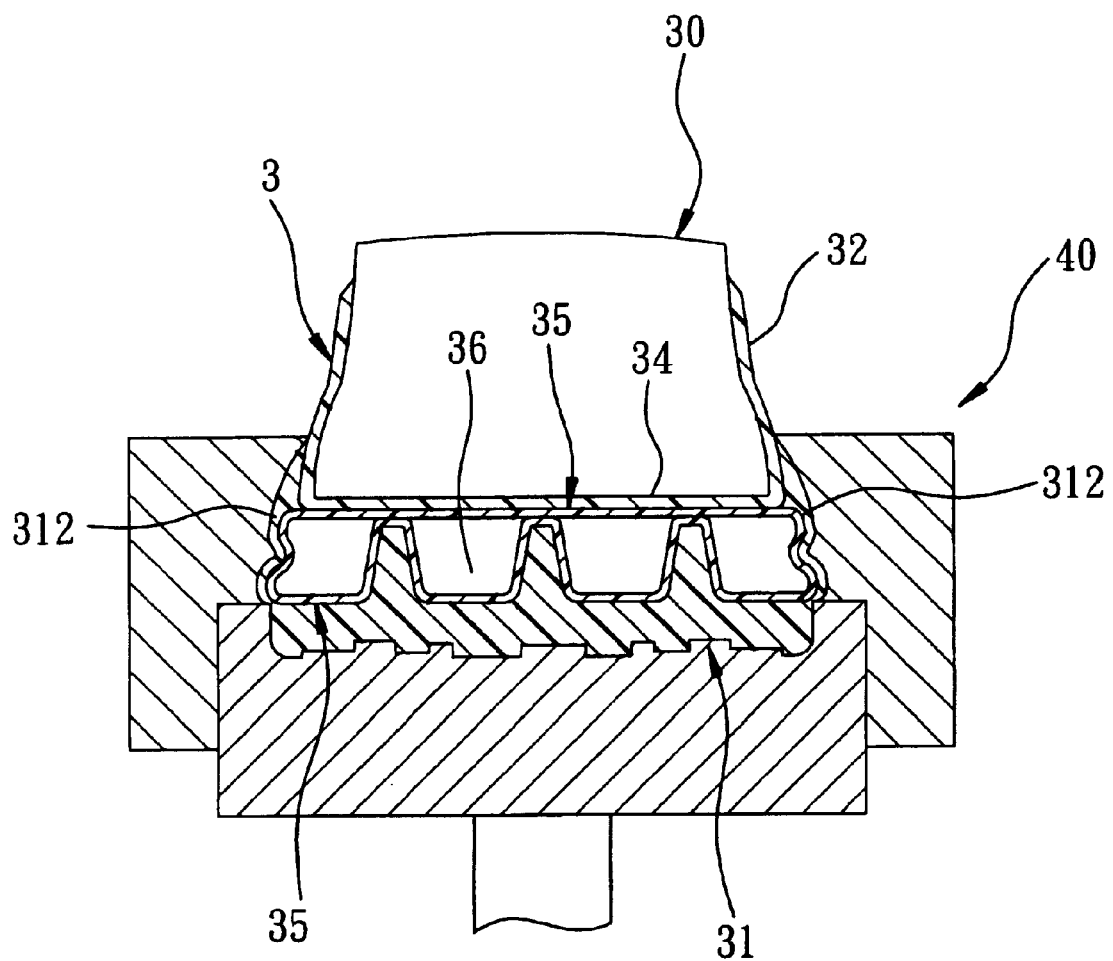
FIG. 8 is a rear sectional view to illustrate how the air cushion is molded with an upper and an outsole of the article of footwear of FIG. 3 in a mold according to the method of this invention.

Referring to FIGS. 5 to 8, in combination with FIG. 4, the article of footwear of this invention can be made by a method including the steps of: preparing the upper 3 and the outsole 31; mounting the upper 3 on a last 30; forming the air cushion 35 which is made from polyurethane and which is inflatable; placing and assembling the air cushion 35, the outsole 31, and the upper 3 which is mounted on the last 30 in a mold 40 in such a manner that the air cushion 35 is sandwiched between the insole 34 and the outsole 31, that the top wall 351 confronts the insole 34, that the horizontal wall portion 3521 of the bottom wall 352 confronts the horizontal base 310, and that each of the studs 311 extends into a respective one of the grooves 3522; injecting air into the air chamber 36 so as to permit expansion of the air cushion 35 and so as to permit abutment of the cushion peripheral wall 353 against an inner side wall 411 of a pair of side mold parts 41 of the mold 40, abutment of the top wall 351 against the insole 34, and abutment of the horizontal wall portion 3521 of the bottom wall 352 against the horizontal base 310; and thermally molding assembly of the air cushion 35, the outsole 31, and the upper 3 in the mold 40 so as to shape the cushion peripheral wall 353 in accordance with the shape of the inner side wall 411 of the side mold parts 41 of the mold 40 and so as to permit bonding between the top wall 351 and the insole 34, between the horizontal wall portion 3522 of the bottom wall 352 and the horizontal base 310, and between each of the studs 311 and the respective groove-confining wall 3522. Since the cushion peripheral wall 353 is pressed against the inner side wall 411 of the side mold part 41 during the molding stage, the cushion peripheral wall 353 is capable of being patterned in accordance with the pattern on the inner side wall 411 of the side mold part 41.

The cushion peripheral wall 353 of the air cushion 35 is formed with an air inlet 16 at a heel position of the article of footwear for passage of air into the air chamber 36, and an air outlet 17 opposite to the air inlet 16 at a toe position of the article of footwear for passage of air out of the air chamber 36 during the injection stage. The injected air is heated prior to the injection stage, and is caused to continuously flow out of the air chamber 36 via the air outlet 17 during the injection stage so as to preheat and to soften the air cushion 35 prior to the molding stage, thereby facilitating patterning of the cushion peripheral wall 353 of the air cushion 35 and expediting the molding operation.

Figure 9:
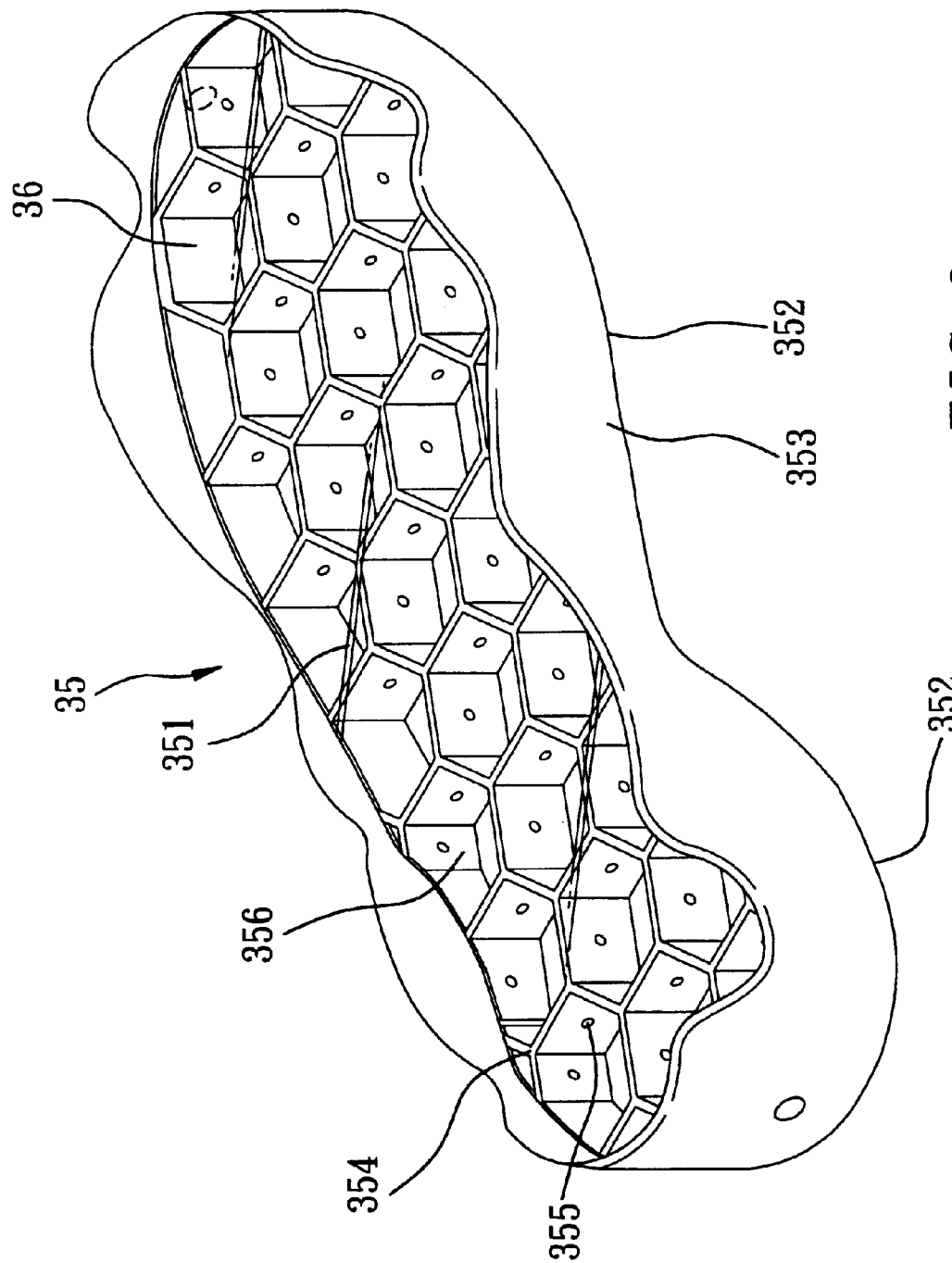
FIG. 9 is a perspective view of a second preferred embodiment of the article of footwear of this invention.
Figure 10:
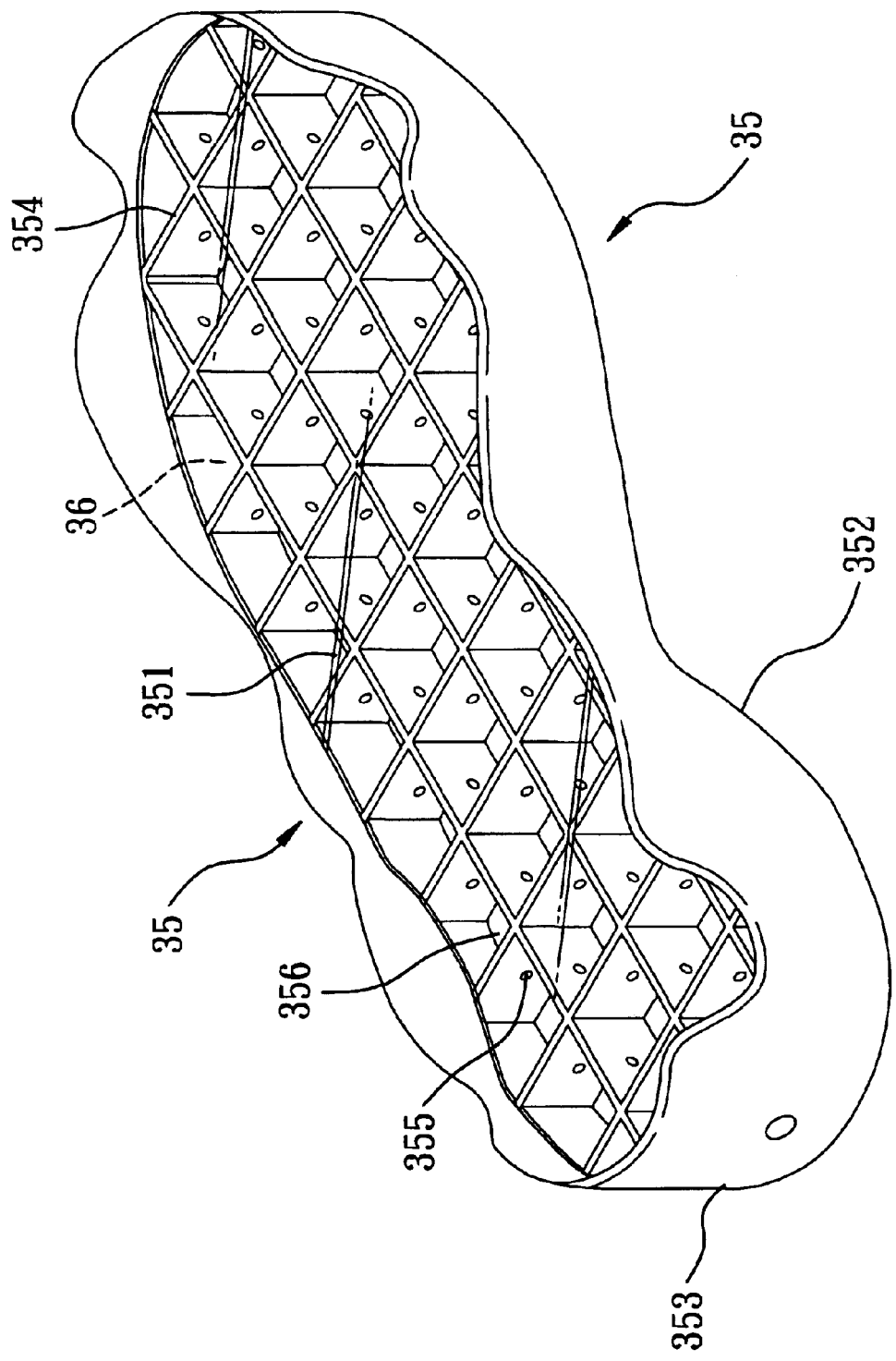
FIG. 10 is a perspective view of a third preferred embodiment of the article of footwear of this invention.

FIGS. 9 and 10 illustrate second and third preferred embodiments of the article of footwear of this invention which are similar to that shown in FIG. 4, except that the air cushion 35 of the second or third preferred embodiment includes a plurality of partitions 354 that sealingly interconnect the top and bottom walls 351, 352, which are flat, to divide the air chamber 36 into a plurality of closed cells 356 so as to enhance the vertical support to the air cushion 35. Each of the partitions 354 is formed with an aperture 355 so as to permit fluid communication between adjacent closed cells 356. The closed cells 356 of the air cushion 35 of FIG. 9 form a honeycomb structure, whereas the closed cells 356 of the air cushion 35 of FIG. 10 form a square grid structure.

With the invention thus explained, it is apparent that various modifications and variations can be made without departing from the spirit of the present invention. It is therefore intended that the invention be limited only as recited in the appended claims.

I claim:

1. An article of footwear comprising:
   an upper having a peripheral wall with a bottom end that defines a bottom opening, and an insole that covers said bottom opening and that is connected to said bottom end of said peripheral wall;
   an outsole spaced apart from and vertically aligned with said insole, having a horizontal base, and formed with a plurality of studs that project from said horizontal base toward said insole; and
   an air cushion sandwiched between said insole and said outsole and including a top wall that is bonded to said insole and that has a peripheral edge, a bottom wall that is bonded to said outsole and that has a peripheral edge, and a cushion peripheral wall that interconnects said peripheral edges of said top and bottom walls, and that cooperates with said top and bottom walls to confine an air chamber thereamong, said bottom wall having a horizontal wall portion that is bonded to said horizontal base of said outsole, and a plurality of grooves, each of which is confined by a groove-confining wall that extends inwardly from said horizontal wall portion into said air chamber, each of said studs extending into a respective one of said grooves and having an outer surface that conforms and that is bonded to said groove-confining wall.

2. The article of footwear of claim 1, wherein said horizontal base of said outsole has a peripheral edge, said peripheral wall of said upper having a bottom portion, said outsole further having a top peripheral flange that has a lower portion extending upwardly from said peripheral edge of said horizontal base and surrounding and bonded to said cushion peripheral wall of said air cushion, and an upper portion extending upwardly from said lower portion and surrounding and bonded to said bottom portion of said peripheral wall of said upper.

3. A method for making an article of footwear, comprising the steps of:

preparing an upper that has a peripheral wall with a bottom end that defines a bottom opening, and an insole that covers the bottom opening and that is connected to the bottom end of the peripheral wall;

preparing an outsole having a horizontal base, and formed with a plurality of studs that project from the horizontal base;

mounting the upper on a last;

forming an inflatable air cushion that includes a top wall with a peripheral edge, a bottom wall with a peripheral edge, and a cushion peripheral wall interconnecting the peripheral edges of the top and bottom walls and cooperating with the top and bottom walls to confine an air chamber thereamong, the bottom wall having a horizontal wall portion, and a plurality of grooves, each of which is confined by a groove-confining wall that extends inwardly of the air chamber from the horizontal wall portion;

placing and assembling the air cushion, the outsole, and the upper which is mounted on the last in a mold in such a manner that the air cushion is sandwiched between the insole and the outsole, that the top wall confronts the insole, that the horizontal wall portion of the bottom wall confronts the horizontal base, and that each of the studs extends into a respective one of the grooves;

injecting air into the air chamber so as to permit expansion of the air cushion and so as to permit abutment of the cushion peripheral wall against an inner side wall of the mold, abutment of the top wall against the insole, and abutment of the horizontal wall portion of the bottom wall against the horizontal base; and thermally molding assembly of the air cushion, the outsole, and the upper in the mold so as to shape the cushion peripheral wall in accordance with the shape of the inner side wall of the mold and so as to permit bonding between the top wall and the insole, between the horizontal wall portion of the bottom wall and the horizontal base, and between each of the studs and the respective groove-confining wall.

4. The method of claim 3, wherein the cushion peripheral wall of the air cushion is formed with an air inlet for passage of air into the air chamber, and an air outlet opposite to the air inlet for passage of air out of the air chamber, the injected air being heated prior to the injection stage and being caused to continuously flow out of the air chamber via the air outlet during the injection stage so as to preheat and to soften the air cushion prior to the molding stage.

5. The method of claim 3, wherein the horizontal base of the outsole has a peripheral edge, the peripheral wall of the upper having a bottom portion, the outsole further having a top peripheral flange that extends upwardly from the peripheral edge of the horizontal base, and that has upper and lower portions, the lower portion surrounding and being bonded to the cushion peripheral wall of the air cushion, and the upper portion surrounding and being bonded to the bottom portion of the peripheral wall of the upper after the molding stage.

6. An article of footwear comprising:

an upper with an insole;

an outsole spaced apart from and vertically aligned with said insole; and an air cushion sandwiched between said insole and said outsole and including a top wall that is bonded to said insole and that has a peripheral edge, a bottom wall that is bonded to said outsole and that has a peripheral edge, and a cushion peripheral wall that interconnects said peripheral edges of said top and bottom walls, and that cooperates with said top and bottom walls to confine an air chamber thereamong, said air cushion further including a plurality of partitions that sealingly interconnect said top and bottom walls to divide said air chamber into a plurality of closed cells, each of said partitions being formed with an aperture so as to permit fluid communication between adjacent closed cells.

7. The article of footwear of claim 6, wherein said closed cells forms a structure that is honeycomb in shape.

* * * * *